(12) United States Patent
Reed (10) Patent No.: US 7,406,529 B2
(45) Date of Patent: Jul. 29, 2008

(54) SYSTEM AND METHOD FOR DETECTING AND VERIFYING DIGITIZED CONTENT OVER A COMPUTER NETWORK

(75) Inventor: Erik James Reed, Pacifica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 738 days.

(21) Appl. No.: 09/780,962

(22) Filed: Feb. 9, 2001

(65) Prior Publication Data

US 2002/0111993 A1 Aug. 15, 2002

(51) Int. Cl.
*G06F 15/16* (2006.01)
(52) U.S. Cl. .................. 709/229; 709/231; 709/203; 707/100; 707/101; 707/6; 707/104.1; 707/1; 713/165; 713/170; 713/176; 713/180; 713/193
(58) Field of Classification Search ................ 709/203, 709/204, 205, 219, 229, 231; 707/26, 51, 707/76, 1, 6, 100, 101, 104.1; 705/51, 54, 705/55, 57, 59, 75; 713/165, 170, 176, 180, 713/193
See application file for complete search history.

(56) References Cited

U.S. PATENT DOCUMENTS

| | | | |
|---|---|---|---|
| 3,568,156 A | 3/1971 | Thompson |
| 4,384,329 A | 5/1983 | Rosenbaum |
| 4,833,610 A | 5/1989 | Zamora |
| 5,062,143 A | 10/1991 | Schmitt |
| 5,182,708 A | 1/1993 | Ejiri |
| 5,241,674 A | 8/1993 | Kuorsawa |
| 5,303,150 A | 4/1994 | Komeda |
| 5,303,302 A | 4/1994 | Burrows |
| 5,371,807 A | 12/1994 | Register |
| 5,392,212 A | 2/1995 | Geist |
| 5,404,505 A | 4/1995 | Levinson |
| 5,418,951 A | 5/1995 | Damashek |
| 5,497,488 A | 3/1996 | Akizawa |
| 5,499,046 A | 3/1996 | Schiller et al. |
| 5,539,635 A | 7/1996 | Larson, Jr. |

(Continued)

FOREIGN PATENT DOCUMENTS

AU  A53031/98  2/1997

(Continued)

OTHER PUBLICATIONS

European Search Report for Application No. EP 02 70 3347 completed Jan. 20, 2005, mailed Feb. 1, 2005 (6 pages).

(Continued)

*Primary Examiner*—Nathan J. Flynn
*Assistant Examiner*—Mohammad Siddiqi
(74) *Attorney, Agent, or Firm*—Greenberg Traurig, LLP; James J. DeCarlo (57) ABSTRACT

A system for detecting digitized content and selecting matches from a master verification database. The detection of digitized content is performed using a verification database which contains a master table of contents identifiers and songprints for corresponding digitized content. A network server is programmed to receive selections of a table of contents identifiers from computers, and to request selections of songprint identifiers from the computers and selects matches from the master verification database.

34 Claims, 3 Drawing Sheets

U.S. PATENT DOCUMENTS

| | | |
|---|---|---|
| 5,548,507 A | 8/1996 | Martino |
| 5,583,763 A | 12/1996 | Atcheson |
| 5,592,511 A | 1/1997 | Schoen |
| 5,608,622 A | 3/1997 | Church |
| 5,616,876 A | 4/1997 | Cluts |
| 5,661,787 A | 8/1997 | Pocock |
| 5,675,786 A | 10/1997 | McKee et al. |
| 5,678,054 A | 10/1997 | Shibata |
| 5,706,365 A | 1/1998 | Rangarajan |
| 5,708,709 A | 1/1998 | Rose |
| 5,713,016 A | 1/1998 | Hill |
| 5,721,827 A | 2/1998 | Logan |
| 5,726,909 A | 3/1998 | Krikorian |
| 5,740,134 A | 4/1998 | Peterson |
| 5,751,672 A | 5/1998 | Yankowski |
| 5,754,938 A | 5/1998 | Herz |
| 5,758,257 A | 5/1998 | Herz |
| 5,764,235 A | 6/1998 | Hunt |
| 5,774,357 A | 6/1998 | Hoffberg et al. |
| 5,790,423 A | 8/1998 | Lau et al. |
| 5,790,935 A | 8/1998 | Payton |
| 5,809,246 A | 9/1998 | Goldman |
| 5,819,160 A | 10/1998 | Foladare |
| 5,842,010 A | 11/1998 | Jain |
| 5,862,220 A | 1/1999 | Perlman |
| 5,862,339 A | 1/1999 | Bonnaure |
| 5,864,868 A | 1/1999 | Contois |
| 5,872,921 A | 2/1999 | Zahariev |
| 5,881,234 A | 3/1999 | Schwab |
| 5,883,986 A | 3/1999 | Kopec |
| 5,884,312 A | 3/1999 | Dustan |
| 5,898,833 A | 4/1999 | Kidder |
| 5,913,040 A | 6/1999 | Rakavy |
| 5,913,041 A | 6/1999 | Ramanathan |
| 5,926,207 A | 7/1999 | Vaughan |
| 5,930,526 A | 7/1999 | Iverson |
| 5,930,768 A | 7/1999 | Hooban |
| 5,931,907 A | 8/1999 | Davies |
| 5,941,951 A | 8/1999 | Day |
| 5,945,988 A | 8/1999 | Williams |
| 5,950,189 A | 9/1999 | Cohen |
| 5,956,482 A | 9/1999 | Agraharam |
| 5,960,430 A | 9/1999 | Haimowitz |
| 5,969,283 A | 10/1999 | Looney |
| 5,977,964 A | 11/1999 | Williams |
| 5,983,176 A | 11/1999 | Hoffert et al. |
| 5,987,525 A | 11/1999 | Roberts et al. |
| 5,996,015 A | 11/1999 | Day |
| 6,000,008 A | 12/1999 | Simcoe |
| 6,009,382 A | 12/1999 | Martino |
| 6,012,098 A | 1/2000 | Bayeh |
| 6,020,883 A | 2/2000 | Herz |
| 6,021,203 A * | 2/2000 | Douceur et al. ............ 380/252 |
| 6,026,398 A | 2/2000 | Brown |
| 6,026,439 A | 2/2000 | Chowdhury |
| 6,029,195 A | 2/2000 | Herz |
| 6,031,795 A * | 2/2000 | Wehmeyer ............ 369/30.28 |
| 6,035,268 A | 3/2000 | Carus |
| 6,038,527 A | 3/2000 | Renz |
| 6,038,591 A | 3/2000 | Wolfe |
| 6,047,251 A | 4/2000 | Pon |
| 6,047,268 A | 4/2000 | Bartoli |
| 6,047,320 A | 4/2000 | Tezuka |
| 6,047,327 A | 4/2000 | Tso |
| 6,052,717 A | 4/2000 | Reynolds |
| 6,061,680 A | 5/2000 | Scherf et al. |
| 6,064,980 A | 5/2000 | Jacobi |
| 6,065,051 A | 5/2000 | Steele et al. |
| 6,065,058 A | 5/2000 | Hailpern |
| 6,070,185 A | 5/2000 | Anupam |
| 6,085,242 A | 7/2000 | Chandra |
| 6,097,719 A | 8/2000 | Benash |
| 6,102,406 A | 8/2000 | Miles |
| 6,105,022 A | 8/2000 | Takahashi |
| 6,131,082 A | 10/2000 | Hargrave |
| 6,134,532 A | 10/2000 | Lazarus |
| 6,138,142 A | 10/2000 | Linsk |
| 6,154,773 A | 11/2000 | Roberts et al. |
| 6,161,132 A | 12/2000 | Roberts et al. |
| 6,161,139 A | 12/2000 | Win |
| 6,167,369 A | 12/2000 | Schulze |
| 6,182,142 B1 | 1/2001 | Win |
| 6,185,560 B1 | 2/2001 | Young |
| 6,192,340 B1 | 2/2001 | Abecassis |
| 6,205,126 B1 | 3/2001 | Moon |
| 6,222,980 B1 | 4/2001 | Asai |
| 6,225,546 B1 | 5/2001 | Kraft |
| 6,226,618 B1 | 5/2001 | Downs et al. |
| 6,230,192 B1 | 5/2001 | Roberts et al. |
| 6,230,207 B1 | 5/2001 | Roberts et al. |
| 6,240,459 B1 | 5/2001 | Roberts et al. |
| 6,246,672 B1 | 6/2001 | Lumelsky |
| 6,249,810 B1 | 6/2001 | Kiraly |
| 6,252,988 B1 | 6/2001 | Ho |
| 6,263,313 B1 | 7/2001 | Milsted |
| 6,272,456 B1 | 8/2001 | de Campos |
| 6,272,495 B1 | 8/2001 | Hetherington |
| 6,282,548 B1 | 8/2001 | Burner |
| 6,292,795 B1 | 9/2001 | Peters |
| 6,298,446 B1 | 10/2001 | Schreiber |
| 6,314,421 B1 | 11/2001 | Sharnoff |
| 6,317,761 B1 | 11/2001 | Landsman |
| 6,321,205 B1 | 11/2001 | Eder |
| 6,321,221 B1 | 11/2001 | Bieganski |
| 6,330,593 B1 | 12/2001 | Roberts et al. |
| 6,343,317 B1 | 1/2002 | Glorikian |
| 6,353,849 B1 | 3/2002 | Linsk |
| 6,370,315 B1 | 4/2002 | Mizuno |
| 6,370,513 B1 | 4/2002 | Kolawa |
| 6,389,467 B1 | 5/2002 | Eyal |
| 6,389,538 B1 | 5/2002 | Gruse et al. |
| 6,405,203 B1 * | 6/2002 | Collart ..................... 707/10 |
| 6,430,539 B1 | 8/2002 | Lazarus |
| 6,434,535 B1 * | 8/2002 | Kupka et al. ............... 705/24 |
| 6,438,579 B1 | 8/2002 | Hosken |
| 6,487,598 B1 | 11/2002 | Valencia |
| 6,490,553 B2 | 12/2002 | Van Thong |
| 6,505,203 B1 | 1/2003 | Adler |
| 6,512,763 B1 | 1/2003 | DeGolia, Jr. |
| 6,513,061 B1 | 1/2003 | Ebata |
| 6,522,769 B1 * | 2/2003 | Rhoads et al. ............. 382/100 |
| 6,526,411 B1 | 2/2003 | Ward |
| 6,532,477 B1 | 3/2003 | Tang |
| 6,535,854 B2 * | 3/2003 | Buchner et al. ............ 704/275 |
| 6,538,996 B1 | 3/2003 | West |
| 6,557,026 B1 | 4/2003 | Stephens, Jr. |
| 6,560,403 B1 * | 5/2003 | Tanaka et al. ............... 386/95 |
| 6,560,704 B2 | 5/2003 | Dieterman |
| 6,587,127 B1 | 7/2003 | Leeke |
| 6,611,812 B2 * | 8/2003 | Hurtado et al. ............. 705/26 |
| 6,611,813 B1 | 8/2003 | Bratton |
| 6,614,914 B1 | 9/2003 | Rhoads |
| 6,615,208 B1 | 9/2003 | Behrens |
| 6,655,963 B1 | 12/2003 | Horvitz |
| 6,657,117 B2 | 12/2003 | Weare |
| 6,658,151 B2 | 12/2003 | Lee |
| 6,661,787 B1 | 12/2003 | O'Connell |
| 6,677,894 B2 | 1/2004 | Sheynblat |
| 6,725,446 B1 | 4/2004 | Hahn |
| 6,741,980 B1 | 5/2004 | Langseth |
| 6,757,740 B1 | 6/2004 | Parekh |
| 6,807,632 B1 * | 10/2004 | Carpentier et al. .......... 713/165 |
| 6,889,383 B1 | 5/2005 | Jarman |
| 6,925,441 B1 | 8/2005 | Jones, III et al. |

| | | | |
|---|---|---|---|
| 6,952,523 B2 * | 10/2005 | Tanaka et al. ............... 386/95 |
| 2001/0005823 A1 | 6/2001 | Fischer |
| 2001/0042107 A1 | 11/2001 | Palm |
| 2001/0042109 A1 | 11/2001 | Bolas |
| 2001/0044855 A1 | 11/2001 | Vermeire |
| 2001/0052028 A1 | 12/2001 | Roberts et al. |
| 2001/0055276 A1 | 12/2001 | Rogers |
| 2002/0002039 A1 | 1/2002 | Qureshey |
| 2002/0004839 A1 | 1/2002 | Wine |
| 2002/0007418 A1 | 1/2002 | Hegde |
| 2002/0010621 A1 | 1/2002 | Bell |
| 2002/0010714 A1 | 1/2002 | Hetherington |
| 2002/0010789 A1 | 1/2002 | Lord |
| 2002/0013852 A1 | 1/2002 | Janik |
| 2002/0016839 A1 | 2/2002 | Smith |
| 2002/0035561 A1 | 3/2002 | Archer |
| 2002/0045717 A1 | 4/2002 | Grenda |
| 2002/0056004 A1 | 5/2002 | Smith |
| 2002/0065857 A1 | 5/2002 | Michalewicz |
| 2002/0082901 A1 | 6/2002 | Dunning |
| 2002/0095387 A1 | 7/2002 | Sosa |
| 2002/0099696 A1 | 7/2002 | Prince |
| 2002/0099737 A1 | 7/2002 | Porter |
| 2002/0111912 A1 * | 8/2002 | Hunter et al. ............... 705/52 |
| 2002/0129123 A1 | 9/2002 | Johnson |
| 2002/0152204 A1 | 10/2002 | Ortega |
| 2002/0175941 A1 | 11/2002 | Hand |
| 2003/0002608 A1 | 1/2003 | Glenn |
| 2003/0007507 A1 | 1/2003 | Rajwan |
| 2003/0028796 A1 | 2/2003 | Roberts et al. |
| 2003/0046283 A1 | 3/2003 | Roberts |
| 2003/0083871 A1 | 5/2003 | Foote |
| 2003/0093476 A1 | 5/2003 | Syed |
| 2003/0133453 A1 | 7/2003 | Makishima |
| 2003/0135513 A1 | 7/2003 | Quinn et al. |
| 2003/0139989 A1 | 7/2003 | Churquina |
| 2003/0165200 A1 | 9/2003 | Pugel |
| 2003/0182139 A1 | 9/2003 | Harris |
| 2003/0190077 A1 | 10/2003 | Ross |
| 2003/0206558 A1 | 11/2003 | Parkkinen |
| 2005/0149759 A1 * | 7/2005 | Vishwanath et al. ........ 713/201 |

FOREIGN PATENT DOCUMENTS

| | | |
|---|---|---|
| AU | 763380 | 3/2000 |
| EP | 01/73639 | 5/1986 |
| EP | 0 847 156 A2 | 9/1997 |
| EP | 1010098 B1 | 4/1998 |
| EP | 1324567 A2 | 4/1998 |
| EP | 0955592 A2 | 4/1999 |
| EP | 0 955 592 A2 | 11/1999 |
| EP | 1010098 B1 | 6/2000 |
| EP | 1 050 833 A2 | 8/2000 |
| EP | 1236354 | 9/2002 |
| EP | 1324567 A2 | 7/2003 |
| GB | 2306869 | 11/1995 |
| JP | 11-514482 | 12/1999 |
| JP | 2001202368 | 7/2001 |
| JP | 2001521642 | 11/2001 |
| WO | WO 98/25269 A1 | 6/1998 |
| WO | WO 98/47080 | 10/1998 |
| WO | WO 98/47080 A2 | 10/1998 |
| WO | WO 99/27681 | 6/1999 |
| WO | WO 99/43111 | 8/1999 |
| WO | WO 00/46681 A1 | 2/2000 |
| WO | WO 00/31964 | 6/2000 |
| WO | WO 00/46681 A1 | 8/2000 |
| WO | WO 01/33379 A1 | 10/2000 |
| WO | WO 01/35667 A1 | 11/2000 |
| WO | WO 01/54323 A2 | 1/2001 |
| WO | WO 01/73639 A1 | 10/2001 |
| WO | WO 02/42862 A2 | 5/2002 |
| WO | WO 03/012695 A2 | 2/2003 |

OTHER PUBLICATIONS

Liu, Z. et al., "Audio Feature Extraction and Analysis for Scene Segmentation and Classification", *Journal of VLSI Signal Processing Systems for Signal, Image, and Video Technology*, Oct. 1998, pp. 61-78, vol. 20, No. 1/2, Kluwer Academic Publishers, Dordrecht, NL (XP000786728/ISSN: 0922-5773).

Wold, E. et al., "Content-Based Classification, Search, and Retrieval of Audio", *IEEE Multimedia*, 1996, pp. 27-36, vol. 3, No. 3, IEEE Computer Society, US (XP002154735/ISSN: 1070-986X).

Written Opinion for International Application No. PCT/US02/03504, Jun. 16, 2004, 8 pages.

Internet Papers: Freetantrum: Songprint 1.2, and computer code; www.freetantrum.org; Dec. 11, 2000; 46 pages.

Stubblefield, et al., "A Security Analysis of My.MP3.com and the Beam-it Protocol", Rice University Department of Computer Science, pp. 1-6, date is missing.

U.S. Appl. No. 60/144,377, filed Jul. 16, 1999, Benjamin E. Hosken.

U.S. Appl. No. 60/165,726, filed Nov. 15, 1999, Sean Michnel Ward.

U.S. Appl. No. 60/165,727, filed Nov. 15, 1999, Sean Michnel Ward.

U.S. Appl. No. 60/166,039, filed Nov. 17, 1999, Sean Michnel Ward.

Alan Griffiths, H. Claire Luckhurst and Peter Willett, "Using Interdocument Similarity Information in Document Retrieval Systems," pp. 365-373, John Wiley & Sons, Inc., 1986.

Ben J. Schafer, et al., "Recommender Systems In E-Commerce", Proceedings ACM Conference On Electronic Commerce, pp. 158-166, XP002199598, 1999.

Brian P. McCune, Richard M. Tong, Jeffrey S. Dean, and Daniel G. Shapiro, "RUBRIC: A System for Rule-Based Information Retrieval," pp. 440-445.

C. J. van Rijsbergen, B.Sc., Ph.D., M.B.C.S, "Information Retrieval," Department of Computing Science—University of Glasgow [online], 1979 [retrieved on Aug. 24, 2001] Retrieved from <URL:http://www.dcs.gla.ac.uk/keith/preface.html> (213 pages).

Carl de Marcken, "The Unsupervised Acquisition of a Lexicon from Continuous Speech," Massachusetts Institute of Technology Artificial Intelligence Laboratory: Center for Biological and Computational Learning, Department of Brain and Cognitive Sciences, A.I. Memo No. 1558 and C.B.C.L. Memo No. 129, Nov. 2001, pp. 1-27.

Connor Hayes, et al., Smart Radio—A Proposal, Technical Report TCD-CS-1999-24, Online! Apr. 1999, pp. 1-14, XP002279579, Trinity College Dublin, Ireland, Retrieved from the Internet: <URL:http://www.cs.tcd.ie/publications/tech-reports/reports.99/TCD-CS-1999-24.pdf>, retrieved on May 7, 2004.

Cyril Cleverdon, "The Cranfield Tests On Index Language Devices," presented Apr. 27, 1967, pp. 47-59, Found in: Readings in Information Retrieval, Edited by Karen Sparck Jones and Peter Willett, Morgan Kaufmann Publishers, Inc., San Francisco, CA, 1997.

Cyril W. Cleverdon and J, Mills, "The Testing Of Index Language Devices," presented Feb. 5, 1963, Chapter 3—Key Concepts, pp. 98-1 10, Found in: Readings in Information Retrieval, Edited by Karen Sparck Jones and Peter Willett, Morgan Kaufmann Publishers, Inc., San Francisco, CA, 1997.

David A. Hull and Gregory Grefenstette, "Querying Across Languages: A Dictionary-Based Approach to Multilingual Information Retrieval," pp. 484-492.

David Nichols, et al., Recommendation And Usage In The Digital Library, Technical Report Ref. CSEG/2/1997, Online! 1997, pp. 1-15, XP002279577, Retrieved from the Internet <URL:ftp://ftp.comp.lancs.ac.uk/pub/reports/1997/CSEG.2.97.pdf>, retrieved on May 7, 2004.

E. Michael Keen, "Presenting Results of Experimental Retrieval Comparisons," Department of Information & Library Studies, University College of Wales, Aberystwyth, Sy23 3AS U.K., pp. 217-222.

F.W. Lancaster, "MEDLARS: Report on the Evaluation of Its Operating Efficiency," pp. 223-246.

Gerard Salton and M. E. Lesk, "Computer Evaluation Of Indexing and Text Processing," pp. 60-84, Found in: Readings in Information Retrieval, Edited by Karen Sparck Jones and Peter Willett, Morgan Kaufmann Publishers, Inc ., San Francisco, CA, 1997.

Gerard Salton and M.J. McGill, "The SMART and SIRE Experimental Retrieval Systems," pp. 381-399.

Gerard Salton and Michael J. McGill, "Introduction to Modern Information Retrieval," Computer Science Series, pp. 1-435, 1983 by McGraw-Hill, Inc., McGraw-Hill Book Company, USA.

Gerard Salton, A. Wong and C.S. Yang, "A Vector Space Model for Automatic Indexing," Cornell University, pp. 273-280.

Gerard Salton, James Allan, Chris Buckley and Amit Singhal, "Automatic Analysis, Theme Generation, and Summarization of Machine-Readable Texts," pp. 478-483.

Ian H. Witten and Eibe Frank, "Data Mining, Practical Machine Learning Tools and Techniques with JAVA Implementations", Academic Press, pp. 57-76.

Jean Tague-Sutcliffe, "The Pragmatics of Information Retrieval Experimentation Revisited," School of Library and Information Science, University of Western Ontario, Canada, pp. 205-216.

Karen Sparck Jones and Peter Willett (Editors),Chapter 3—"Key Concepts," pp. 85-92 Found in: Readings in Information Retrieval, Morgan Kaufmann Publishers, Inc ., San Francisco, CA, 1997.

Karen Sparck Jones, G.J.F. Jones, J.T. Foote, and S.J. Young, "Experiments in Spoken Document Retrieval," pp. 493-502.

Karen Sparck Jones, "Search Term Relevance Weighting Given Little Relevance Information," pp. 329-338, (originally located in Journal of Documentation, vol. 35, No. 1; Mar. 1979, pp. 30-48).

Lauren B. Doyle, "Indexing and Abstracting by Association—Part 1," pp. 25-38, Santa Monica, CA, Found in: Readings in Information Retrieval, Edited by Karen Sparck Jones and Peter Willett, Morgan Kaufmann Publishers, Inc., San Francisco, CA, 1997.

Lisa F. Rau, "Conceptual Information Extraction and Retrieval from Natural Language Input," Artificial Intelligence Program GE Research and Development Center, Schenectady, NY 12301, pp. 527-533.

M. Agosti, G. Gradenigo, P.G. Marchetti, "A Hypertext Environment for Interacting with Large Textual Databases," pp. 469-477.

M.E. Maron and J.L. Kuhns, "On Relevance, Probabilistic Indexing and Information Retrieval," pp. 39-46, Found in: Readings in Information Retrieval, Edited by Karen Sparck Jones and Peter Willett, Morgan Kaufmann Publishers, Inc ., San Francisco, CA, 1997.

MusicMatch Literature downloaded from web.archive.org—7 pages total.

N.J. Belkin, R.N. Oddy, H.M. Brooks, "The Journal of Documentation", pp. 299-304, vol. 38, No. 2, Jun. 1982.

R. Brody, Ph.D., "The Conditions and Consequences of Profiling in Commercial and Governmental Settings," Technology And Society, 1998. ISTAS 98. Wiring The World: The Impact Of Information Technology On Society, Proceedings of the 1998 International Symposium on South Bend, IN, USA Jun. 12-13, 1998, NY, NY, USA, IEEE, US, Jun. 12, 1998, pp. 148-154, XP010291443, ISBN: 0-7803-4327-1 *the whole document*.

S.E. Robertson, "The Probability Ranking Principle In 1R," School of Library, Archive, Information Studies, University College of London, pp. 281-286.

S.E. Robertson and S. Walker, "Some Simple Effective Approximations to the 2—Poisson Model for Probabilistic Weighted Retrieval," Centre for Interactive Systems Research, Department of Information Science, City University, Northampton Square, London, EC1V OHB, U.K., pp. 345-354.

Shoshana Loeb, "Architecting Personalized Delivery Of Multimedia Information", Communications Of The ACM, vol. 25, No. 12, Dec. 1992, pp. 39-50, XP002102709.

Tej Shah, "Improving Electronic Commerce Through Gathering Customer Data", TCC402 [online] Apr. 23, 1998 XP002379874, University of Virginia, USA, Retrieved from the Internet: <URL:http://www.lib.virginia.edu> [Retrieved on May 8, 2006] *the whole document*.

Thomas Hoffman, et al., "Latent Class Models For Collaborative Filtering", Proceedings Of The Sixteenth International Joint Conference On Artificial Intelligence, IJCAI 99, Stockholm, Sweden, Jul. 31-Aug. 6, 1999, Online! pp. 688-693, XPOO2279578, Retrieved from the Internet <URL:http:/Avww.cs.brown.edu/(th/papers/HofmannPuzicha-IJCA199.pdf>, retrieved on May 7, 2004.

Tomek Strzalkowski, "Robust Text Processing in Automated Information Retrieval," Courant Institute of Mathematical Sciences, pp. 317-322.

Unjung Nam, Lectures: "Mel-Frequency Cepstral Analysis," [online] [retrieved on Feb. 2, 2001] Retrieved from the Internet <URL:http://www.ccrma.standford.edu/~unjung/mylec/mfcc.html>, pp. 1-3.

W. B. Croft and D. J. Harper, "Using Probabilistic Models of Document Retrieval Without Relevance Information," Department of Computer & Information Science, University of Massachusetts, pp. 339-344.

W. J. Hutchins, "The Concept of 'Aboutness' in Subject Indexing," presented Apr. 18, 1977, Chapter 3—Key Concepts, pp. 93-97, Found in: Readings in Information Retrieval, Edited by Karen Sparck Jones and Peter Willett, Morgan Kaufmann Publishers, Inc ., San Francisco, CA, 1997.

Charu, C. Aggarwal, Cecilia Procopiuc, Joel L. Wolf, Philip S. Yu, and Jong Soo Park, "Fast Algorithm For Projected Clustering" Proceedings of the ACM Sigmod International Conference on Mangement of Data, 1999; pp. 1-12.

Gerard Salton and C. Buckley, "Term Weighting Approaches In Automatic Text Retrieval" (received Nov. 19, 1987; accepted in Final form Jan. 26, 1988), Dept of Computer Science, Cornell University, Ithaca, NY; pp. 1-11.

Ian Goldbeerg, Steven D. Gribble, David Wagner, Eric A Brewer, "The Ninja Jukebox"--Oct. 14, 1999 pp. 1-11.

Japanese Office Action (Japanese App. No. 2002-565197) Aug. 21, 2007.

Translation of Abstract for JP-A-11-514482 Aug. 21, 2007.

Ben J. Schafer, et al., "Recommender Systems In E-Commrece", Proceedings ACM Conference On Electronic Commerce, pp. 158-166, XP002199598, 1999.

C. J. van Rijsbergen, B.Sc., Ph.D., M.B.C.S. "Information Retrieval," Department of Computing Science - University of Glasgow [online], 1979 [retrieved on Aug. 24, 2001] Retrieved from <URL:http://www.dcs.gla.ac.uk/keith/preface.html> (213 pages).

Charu C. Aggarwal, Cecilia Procopiuc, Joel L. Wolf, Philip S.Yu, and Jong Soo Park, "Fast Algorithm for Projected Clustering;", Proceedings of the ACM Sigmod International Conference on Management of Data, 1999.

Connor Hayes, et al., Smaert Radio - A Proposal, Technical Report TCD-CS-1999-24, Online! Apr. 1999, pp. 1-14, XP002279579, Trinity College Dublin, Ireland, Retrieved for the Internet: <URL:http://www.cs.tcd.ie/publications/tech- reports/reports.99/TCD-CS-1999-24.pdf>, retrieved on May 7, 2004.

Cyril W. Cleverdon and K, Mills, "The Testing Of Index Language Devices," presented Feb. 5, 1963, Chapter 3 - Key Concepts, pp. 98 - 1 10, Found in: Readings in Information Retrieval, Edited by Karen Sparck Jones and Peter Willett, Morgan Kaufmann Publishers, Inc., San Francisco, CA, 1997.

Gerard Slaton and C. Buckley, "Term-Weighting Approaches In Automatic Text Retrieval," (received Nov. 19, 1987; accepted in final form Jan. 26, 1988), Department of Computer Science, Cornell University, Ithaca, NY.

Gerard Slaton and Michael J. McGill, "Introduction to Modern Information Retrieval," Computer Science Series, pp. 1 -435, 1983 by McGraw-Hill, Inc., McGraw-Hill Book Company, USA.

Ian Goldberg, Steven D. Gribble, David Wagner, Eric A. Brewer "The Ninja Jukebox" Oct. 14, 1999.

Karen Sparck Jones and Peter Willett (Editors),Capter 3 - "Key Concepts," pp. 85 -92 Found in: Readings in Information Retrieval, Morgan Kaufman Publishers, Inc., San Francisco, CA, 1997.

Lauren B. Doyle, "Indexing and Abstracting by Association - Part 1," pp. 25 - 38, Santa Monica, CA, Found in: Readings in Information Retrieval, Edited by Karen Sparck Jones and Peter Willett, Morgan Kaufmann Publshers, Inc., San Francisco, CA, 1997.

N.J. Belkin, R.N., Oddy, H.M. Brooks, "The Journal of Documentation", pp. 299-304, vol. 38, No. 2, Jun. 1982.

R. Brody, Ph.D., "The Conditions and Consequences of Profiling in Commerical and Governmental Settings," Technology On Society, Proceedings of the 1998 International Symposium on South Bend, IN, USA Jun. 12-13, 1998, NY, NY, USA, IEEE, US, Jun. 12, 1998 (Jun. 12, 1998), pp. 148-154, XP010291443, ISBN: 0-7803-4327-1.

Shoshanan Loeb, "Architecting Personalized Delivery Of Multimedia Information", Communications Of The ACM, vol. 25, No. 12, Dec. 1992, pp. 39-50, XP002102709.

Tej Shah, "Improving Electronic Commerce Though Gathering Customer Data", TCC402 [online] Apr. 23, 1998 (Apr. 23, 1998) XP002379874, University of Virgina, USA, Retrieved from the Internet: <URL:http://ww.lib.virginia.edu> [Retrieved on May 8, 2006].

Stubblfield A. and Wallach D., "A Security Analysis Of My.MP3.com And The Beam-It Protocol"; Tech report TR-00-353, Department of Computer Science, Rice Univeristy, Feb. 2000.

McCune, Et al., "Rubric: A System For Rule-Based Information Retrieval", Found In; Readings in Information Retrieval , Edited by Karen Sparck Jones and Peter Willett, Morgan Kaufmann Publishers, Inc., San Francisco, CA 1997: pp. 440-445.

Hull D. and Grefenstette, "Querying Across Languages: A Dictionary-Based Approach To Multilingual Information Retrieval";Found In: Readings in Information Retrieval , Edited by Karen Sparck Jones and Peter Willett, Morgan Kaufmann Publishers, Inc., San Francisco, CA 1997; 484-492.

Keen,E: "Presenting Results Of Experimental Retrival Comparisons"; Found In: Readings in Information Retrieval , Edited by Karen Sparck Jones and Peter Willett, Morgan Kaufman Publishers, Inc., San Francisco, CA 1997; pp. 217-222.

Lancaster F.W., "Medlars: Report On The Evaluation Of Its Operating Efficiency"; Found In; Readings in Information Retrieval , Edited by Karen Sparck Jones and Peter Willett, Morgan Kaufmann Publishers, Inc., San Francisco, CA 1997; pp. 223-246.

Salton G, and McGill M.J; "The Smart And Sire Experimental Retrieval Systems"; Found In: Readings in Information Retrieval , Edited by Karen Sparck Jones and Peter Willett, Morgan Kaufmann Publishers, Inc., San Francisco, CA 1997; pp. 381-399.

Salton G, et al.; "A Vector Space Model For Automatic Indexing"; Found In: Readings in Information Retrieval , Edited by Karen Sparck Jones and Peter Willett, Morgan Kaufmann Publishers, Inc., San Francisco, CA 1997; pp. 273-280.

Salton, et al.; "Automatic Analysis, Theme Generation, And Summarization Of Machine-Readable Texts"; Found In: Readings in Information Retrieval , Edited by Karen Sparck Jones and Peter Willett, Morgan Kaufmann Publishers, Inc., San Francisco, CA 1997; pp. 478-483.

Witten I. and Frank E.; "Data Mining, Practical Machine Learning Tools and Techniques with Java Implementations", Academic Press, CA 2000, pp. 57-76.

Tague-Sutcliffe, J. "The Pragmatics Of Information Retrieval Experimentation Revisited";Found In: Readings in Information Retrieval , Edited by Karen Sparck Jones and Peter Willett, Morgan Kaufmann Publishers, Inc., San Francisco, CA 1997; pp. 205-216.

Jones, et al.; "Experiments In Spoken Document Retrieval"; Found In: Readins in Information Retrieval, Edited by Karen Sparck Jones and Peter Willett, Morgan Kaufmann Publishers, Inc., San Francisco, Ca 1997; pp. 4493-502.

Rau L, "Conceptual Information Exxtraction and Retrieval From Natural Language Input"; Found In: Readings in Information Retrieval , Edited by Karen Sparck Jones and Peter Willett, Morgan Kaufmann Publishers, Inc., San Francisco, CA 1997; pp. 527-533.

Agosti M., et al.; "A Hypertext Environment For Interacting With Large Textual Databases"; Found In: Readings in Information Retrieval , Edited by Karen Sparck Jones and Peter Willett, Morgan Laufmann Publishers, Inc., San Francisco, CA 1997; pp. 469-477.

Porter M.F. "An Algorithm For Suffix Stripping"; Found In: Readings in Information Retrieval , Edited by Karen Sparck Jones and Peter Willett, Morgan Kaufmann Publishers, Inc., San Francisco, CA 1997; pp. 313-316.

Music Match Literature; "Simply The Worlds' Best Music Player"; webarchive.org; May 8, 1999; 7 pages.

Robertson, S.E.; "The Probability Ranking Principle In Ir"; Found In: Readings in Information Retrieval , Edited by Karen Sparck Jones and Peter Willett, Morgan Kaufmann Publishers, Inc., San Francisco, Ca 1997; pp. 281-286.

Robertson, S.E., and Wlaker S.; "Some Simple Effective Approximations To The 2-Poisson Model For Probabilstic Weighted Retrieval", Found In: Readings in Information Retrieval , Edited by Karen Sparck Jones and Peter Willett, Morgan Kaufamnn Publishers, Inc., San Francisco, Ca 1997; pp. 345-354.

Strzalkowski T; "Robust Text Processing In Automation Information Retrieval"; Found In: Readings in Information Retrieval , Edited by Karen Spark Jones and Peter Willett, morgan, Kaufmann Publishers, Inc., San Francisco, CA 1997; pp. 317-322.

Croft W.B. and Harper D.J; "Using Probabilistic Models of Document Retrieval Without Relevance Information"; Found In: Readings in Information Retrieval , Edited by Karen Sparck Jones and Peter Willett, Morgan Kaufmann Publishers, Inc., San Francisco, Ca 1997; pp. 339-344.

Real Networks Literature: Real Networks-The Home of Streaming Medica; webarchive.org; Jan. 17, 1999; Sep. 2, 1999 and Mar. 3, 2000; 16 pages.

* cited by examiner

SYSTEM AND METHOD FOR DETECTING AND VERIFYING DIGITIZED CONTENT OVER A COMPUTER NETWORK

BACKGROUND OF THE INVENTION

This invention relates to the field of online digital content distribution and more particularly, to a system and method for facilitating music distribution and authentication over a communications network.

The internet has created a highway for users and companies to share digitized content. Online services allow digitized content stored on servers to be shared by multiple users via the internet. Online services also allow users to play digitized content stored in an Internet-connected repository.

It is advantageous for online service providers to detect and verify whether or not the user has a physical copy of digitized content, such as a CD or DVD, prior to allowing the user access to the digitized content.

SUMMARY OF THE INVENTION

The present invention system identifies and authenticates digitized content, such as compact audio disc (hereinafter "CD-Audio," or "CD") residing in a CD-Audio-compatible drive of a computer and verifies that the CD is authentic or an exact replica. However, the present invention is not limited to CD verification. In certain embodiments of the invention, digitized content stored on DVDs or other medium including a physical disc, disc drive, or in solid state memory devices, may be verified. The invention may be practiced in a number of electronic devices, including personal computers, disc players such as CD players and DVD players, and other electronic devices. In certain embodiments according to the present invention, a verification database is created from a set of master CDs. The verification database contains records of CDs and a corresponding table-of-contents, also known as a table-of-contents identifier, (hereinafter "TOC") and corresponding selected audio data from the CD.

After the verification database is created, verification of a CD to the master CD may be performed. The CD is first identified by matching the TOC from the CD against the verification database. Using the TOC data the system identifies one or more master CDs with a similar TOC. The identified CDs are then authenticated by matching selected audio data from the CD against the verification database created from a set of master CDs.

DETAILED DESCRIPTION OF THE INVENTION

In the following embodiments of the invention, common reference numerals are used to represent the same components. If the features of an embodiment are incorporated into a single system, these components can be shared and perform all the functions of the described embodiments.

Figure 1:
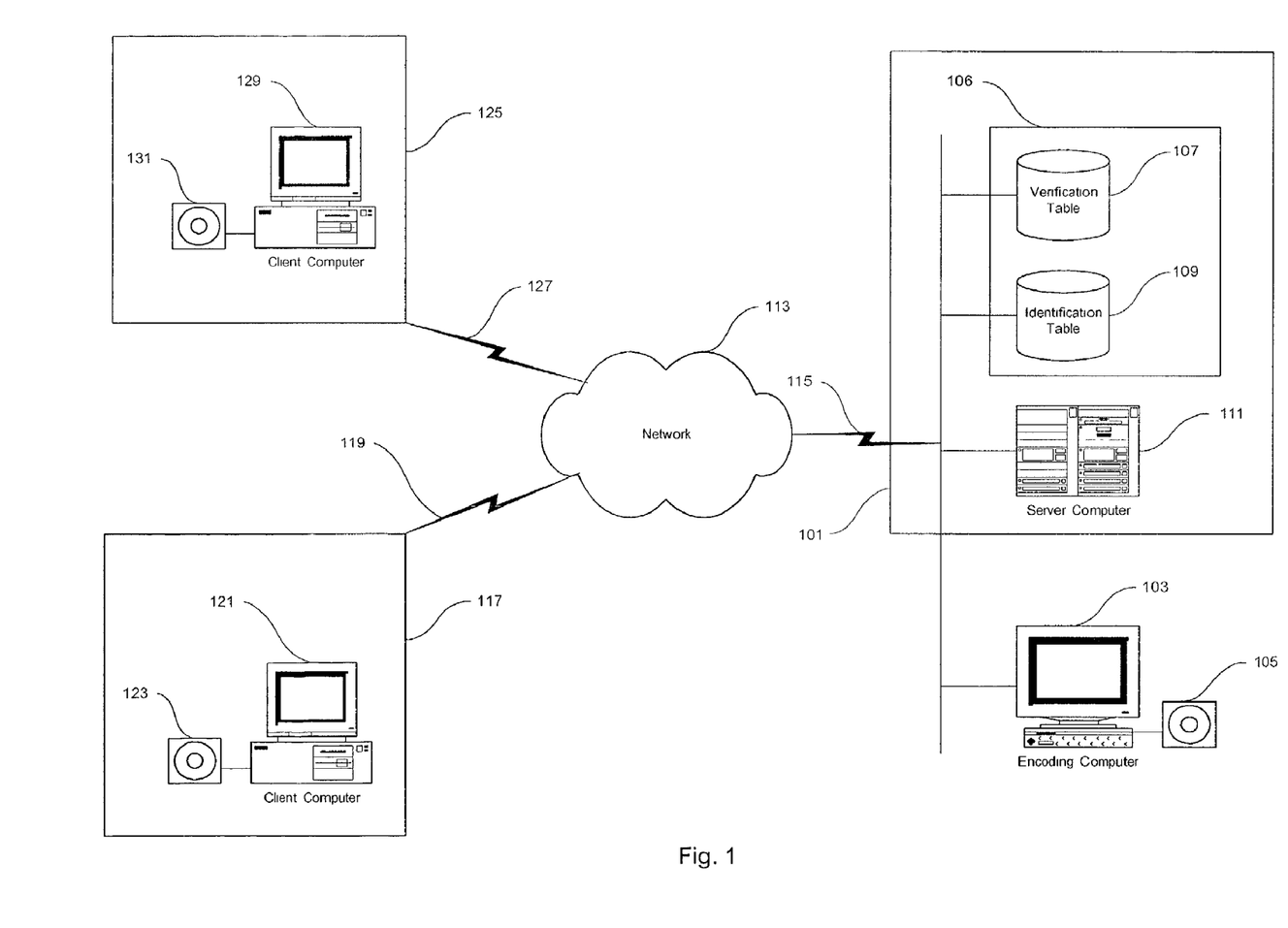
FIG. 1. details the overall architecture of the system.

In FIG. 1, a Server 111 and a Client 121 communicate with each other via a communications network 113 for the purpose of identifying and authenticating or verifying digital content. In one embodiment of the present invention, a user inserts a CD for verification in a CD Reader 123, the Client 121 controls the CD Reader 123 as necessary to acquire data from the CD. The Client 121 communicates the data to the Server 111.

The Client 121 is a general purpose personal computer programmed to read CDs from the CD reader 123. The Client 121 is typically located at a remote location 117 which is connected to the network 113 via a communications link 119. In one embodiment the Client 121 is used by an Internet user computing from their home or office. The communications link 119 may be a dial-in modem connecting to an internet service provider or a broad-band service such as DSL or cable internet access.

The Server 111 is programmed to receive information from the Client 121 for verification with information stored in the Verification Database 106. The Server 111 is typically programmed to facilitate multiple connections from Clients 121 and 129, each with a CD Reader 123 and 131 respectively, and connected to the Network 113 via a communications link 115. The Clients 121 and 129 are also connected to the Network 113 via communications likes 119 and 127 respectively. Typically the Server 111 and the Verification Database 106 are located at a Server Facility 101 to optimize system performance. In another embodiment, the Server 111 may be located in a separate facility from the Verification Database 106. In a preferred embodiment of the invention the Server 111 is a high performance micro-computer running the UNIX operating system.

Before the Server 111 can identify and verify CDs for the Client 121, the corresponding CD data must be stored in the Verification Database 106. An Encoding Computer 103 is programmed to read master CDs from a CD reader 105 and store data about the CD in the Verification Database 106. Alternatively, data about the CD is computed from digital audio files stored on a computer that contain a copy of the audio data found on a master CD.

The Verification Database 106 is comprised of a Verification Table 107 and an Identification Table 109. Creation of the Verification Database 106 is accomplished by computing and storing entries in the database for each CD to be identified and verified by the Encoding Computer 103. Each database entry comprises several elements of identification and verification data which are computed from the TOC and audio data extracted from an original, authentic CD title.

In one embodiment of the present invention the various components and computers of the system communicate with each other using a general connection-oriented protocol such as the Transmission Control Protocol/Internet Protocol (TCP/IP), which is described in Internetworking with TCP/IP, 3d. ed., Douglas E. Comer, (1995), which is hereby incorporated by reference. However, the present invention is not limited to TCP/IP or any other particular network architecture, software or hardware which may be described herein. The principles of the invention apply to other communications protocols, network architectures, hardware and software which may come to compete with or even supplant the state of the art at the time of the invention.

Figure 2:
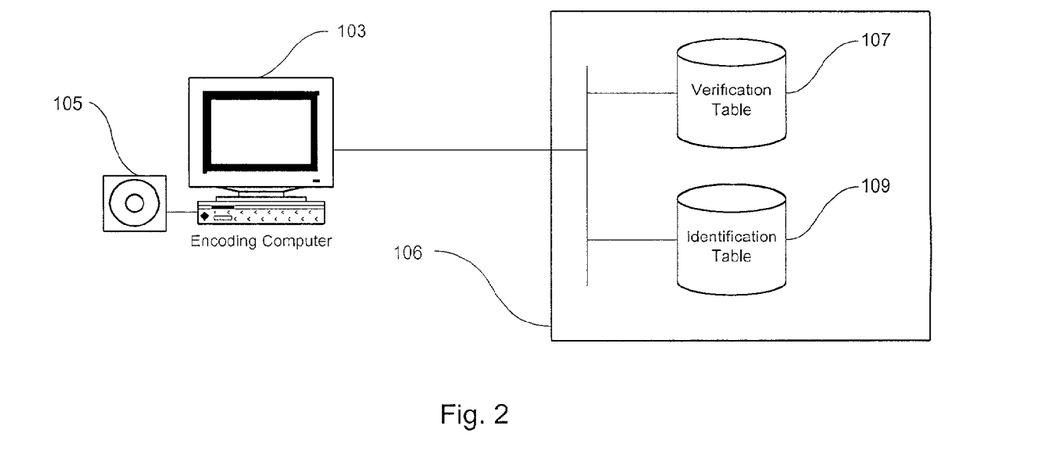
FIG. 2. details the verification database creation system.

In FIG. 2 the Verification Database 106 is comprised of two tables: an Identification Table 109 and a Verification Table 107. Each entry in the Identification Table 109 comprises a subset of the TOC data from the corresponding CD title, and multiple subsets of TOC data are stored for each corresponding CD title. This data is used during the identification phase of the disc verification procedure to quickly locate CDs that have a TOC similar to the CD being identified. The Identification Table 109 is comprised of the following fields:

Disc Identifier—A value assigned during database creation that uniquely identifies the CD.

TOC Identifier—A hash value computed from the CD TOC.

Disc Length—Total length (in blocks) of the audio portion of the CD.

First Track Length—Length (in blocks) of the first audio track on the CD.

Last Track Length—Length (in blocks) of the last audio track on the CD.

Shortest Track Length—Length (in blocks) of the shortest audio track on the CD.

Longest Track Length—Length (in blocks) of the longest audio track on the CD.

Disc Songprint—An identifying value computed from the CD audio data.

Once created, the entire Identification Table 109 may be sorted by and stored in ascending or descending order using the value of the Disc Length field to facilitate faster look ups.

In FIG. 2 the Verification Table 107 is comprised of identification and verification data that is both copied and computed from the corresponding CD title by the Encoding Computer 103. This data is used during the disc verification procedure to test the identity and validity of the CD being verified. The Verification Table 107 is comprised of a number of individual keys. Each key is computed by the Encoding Computer 103 and stored in the Verification Table 107. The value of each key is derived from audio data read from a certain region of the CD by the CD Reader 105, as instructed by the Verification Table 107. An entry in the Verification Table 107 is comprised of the following fields:

Descriptive Data—Includes CD title and artist.

Disc Identifier—A value assigned during database creation that uniquely identifies the CD.

TOC Identifier—A hash value computed from the CD TOC.

Disc Songprint—An identifying value computed from the CD audio data.

Track Data—The following fields are included for each track:
 Length—Length (in blocks) of the track
 Alignment Guide Data—Data derived from the audio data of the track
 Title—Textual title of the track
 Track Songprint—An identifying value computed from the audio data of the track.

Key Data—The following fields are included for each key:
 Track—The number of the track which includes the key region.
 Offset—The location of the key region within the specified track.
 Alignment Guide Data—Data derived from the audio data in the key region.
 Hash Data—A hash value computed from the audio data in the key region.
 Key Songprint—An identifying value computed from the audio data in the key region.

The Encoding Computer 103 calculates a TOC identifier. A TOC identifier is computed from the CD TOC data by computing a cryptographic hash value using SHA-1 (Secure Hash Algorithm) of the concatenation of the lengths, in blocks, of each track on the CD represented as 4-byte values and truncating the resulting 20-byte hash value to 8 bytes.

The Encoding Computer 103 calculates a songprint. A songprint is a 128-byte value that represents the spectral content of a region of a digital audio recording. It is computed by the following steps:

The two stereo channels are averaged to produce a single channel.

The songprint region is divided into 512-byte chunks. Any partial chunks are discarded. Additionally, for each chunk, the following computations are made:
 The data is detrended by computing a linear regression and removing the result.
 A Hanning window is applied to the data.
 A Fast Fourier Transform (FFT) is computed for the data.
 The DC component of the result is discarded.
 The squared magnitudes of each of the remaining spectral components are computed.
 The spectral components are divided into groups of 4 and averaged to produce 64 spectral components.

Each of the first 64 bytes of the songprint value is computed as follows:
 The mean of each of the 64 spectral components resulting from each chunk is computed.
 The mean is converted to a logarithmic value by computing the log 10 and multiplying by 10. Values less than $1\times10^{-20}$ are assigned the value $-200$.
 The resulting dB value is scaled and shifted then converted to an unsigned integer byte value. The scale and shift amounts are chosen to maximize resolution within the range (0-255) expressible in a single byte.

Each of the final 64 bytes of the songprint value is computed as follows:
 The standard deviation of each of the 64 spectral components resulting from each chunk is computed.
 The standard deviation is converted to a logarithmic value by computing the log 10 and multiplying by 10.
 The resulting dB value is scaled and shifted then converted to an unsigned integer byte value. The scale and shift amounts are chosen to maximize resolution within the range (0-255) expressible in a single byte.

The Encoding Computer 103 uses the region to generate the songprint; the region varies between the Disc and Track Songprints and the Key Songprints. The Encoding Computer 103 selects the songprint region by first identifying the length of any "silent" audio at the beginning of the track. This is accomplished by reading 4096-byte blocks of audio data and computing a root-mean-square (RMS) of the amplitude of the samples (the two channels are averaged for each sample during this computation).

The end of the initial silent portion of a track is located by finding the first block that has an RMS amplitude which exceeds the predefined threshold. The beginning of the songprint region is then computed by adding a predefined offset. The length of the songprint region is a predefined value.

For Track Songprints, the RMS amplitude threshold for detecting the end of the initial silence is 0.001. The predefined offset from the end of the initial silence to the beginning of the songprint region is 30 seconds (30*75*2352 bytes). The predefined length of the songprint region is 5 seconds (5*75*2352 bytes).

A Disc Songprint is defined as the Track Songprint for the first track on the CD. The Key Songprint region is the same as the key region. This is because no silence detection or region offset is applied. The Key Songprint region length, like the key region length, is 4096 bytes.

The Encoding Computer 103 generates a Track Alignment Guide. A Track Alignment Guide comprises a 4-byte sample search value and a 4-byte hash value computed from the audio data block midway through the track. If the track is an odd number of blocks in length, the block at the midpoint is used. If the track is an even number of blocks in length, the block immediately after the midpoint is used.

The 4-byte sample search value is the first 4 bytes of the audio data block. The 4-byte hash value is computed by hashing the first 64 bytes of the audio data block using the SHA-1 algorithm and truncating the result to 4 bytes.

The Encoding Computer 103 generates a Key Alignment Guide. A Key Alignment Guide comprises eight 2-byte samples taken from the audio data contained within a key region. The samples are taken at 292-sample intervals starting with the first sample contained within the key region (samples offsets 0, 292, 584, 876, 1168, 1460, 1752, and 2044).

The Encoding Computer 103 generates a Key Hash Data. Key Hash Data is computed by hashing all the bytes contained within the key region using the SHA-1 algorithm and storing the entire 20-byte hash result.

Figure 3:
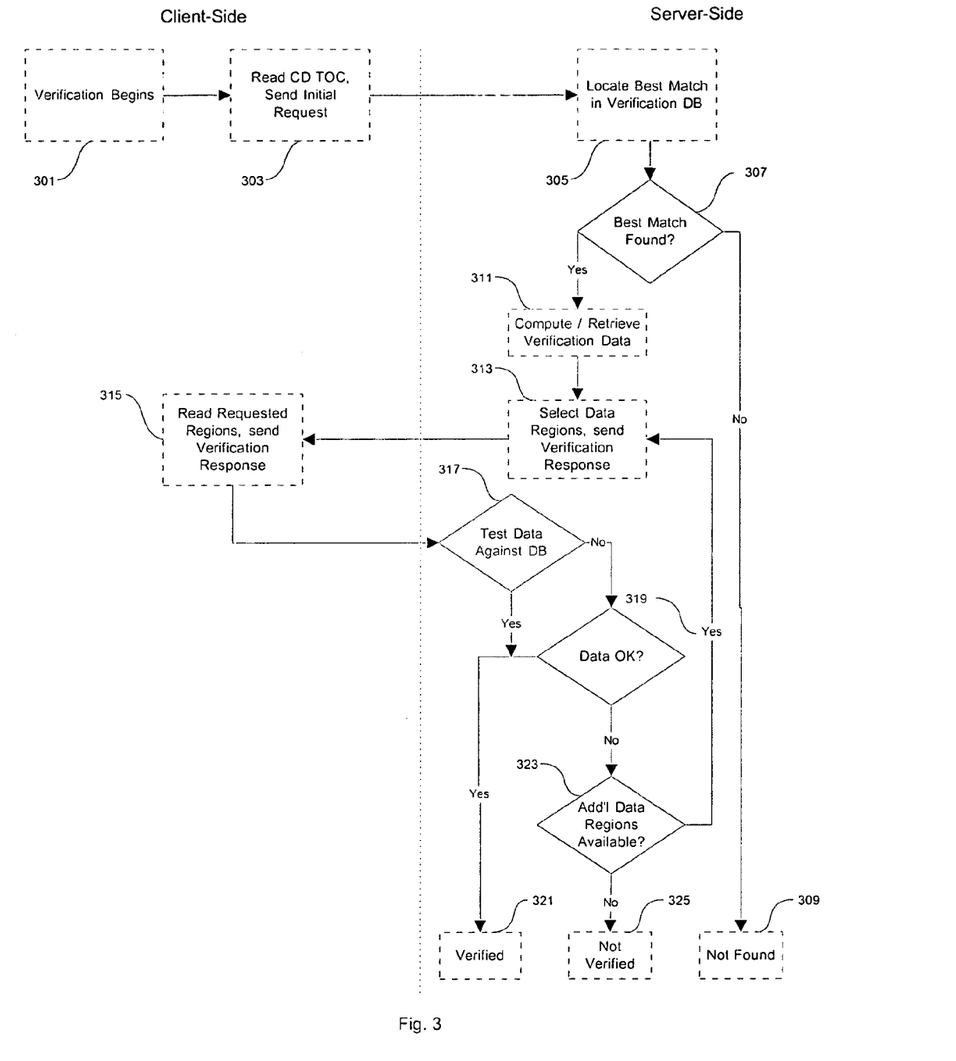
FIG. 3. depicts key client and server operations during identification and verification.

In FIG. 1, the verification procedure is accomplished through a sequence of processes and messages that are exchanged between a Client 121 in which the CD to be verified is located, and a Server 111 which queries a Verification Database 106 as shown in more detail in FIG. 3. The Client 121 and the Server 111 communicate using a network 113. In another embodiment of the invention, the Server 111 may contain the Verification Database 106 internally.

In FIG. 3 block 301 the client begins the verification process. Typically the client may be programmed to begin the process whenever a disc is inserted into the CD reader 123. In block 303, the client reads the Table-of-Contents data from the CD using the appropriate features of the client operating system. Also in block 303, the TOC data is formatted and placed into the Initial Request message. The Initial Request message may be formatted to contain subsets of the TOC data, or the complete TOC data. Also in block 303, the client computes the Disc Songprint for the CD according to the algorithm specified earlier and places it into the Initial Request message, which is sent to the server.

In block 305 Initial Request Processing is performed by the server upon receipt of an Initial Request message from the client. The server receives the Initial Request message from the client and proceeds to extract the TOC and Disc Songprint. The server, using the Identification Table, then locates the entry that best matches the TOC and Disc Songprint provided by the client. The server performs a binary search of the Identification Table (which is sorted by Disc Length) to find the entry that most nearly matches the disc length specified in the TOC.

In block 305, beginning with the entry in the Identification Table identified above, the server compares all neighboring entries to the TOC and Disc Songprint provided by the client. For each entry, the server first tests whether the disc length specified by the TOC and the disc length recorded in the table entry are within a specified limit. The server then computes the root-mean-square (RMS) of the differences between each of the first-, last-, shortest-, and longest-track fields of the table entry and the corresponding data from the TOC. The RMS difference must fall within a specified limit. Finally, the server computes the RMS difference between the corresponding data points (each of the 128 bytes) in the table entry songprint and the Disc Songprint provided by the client.

In block 307, the server selects the entry in the Identification Table that has the smallest RMS difference between the songprint and the one provided by the client, the Best Match. If that RMS difference does not fall within a specified limit, the verification fails and the server constructs a Disc Not Found message in block 309. If the RMS for the Best Match falls within the specified limit, the process proceeds to block 311.

In another embodiment, the server computes the RMS difference between the client-provided and database-provided values for each of the disc length, the first-, last-, shortest-, and longest-track fields, and each of the 128 bytes of the songprint and weights those individual differences to compute a single weighted-difference value representing the overall fit between the client-provided and database-provided data. The server selects as the Best Match the entry in the Identification Table that results in the smallest weighted-difference. In an alternate embodiment, the server selects all the entries which have weighted-difference values less than a predefined threshold and attempts to verify each of these Matches.

In block 311, the server locates the entries in the Verification Table corresponding to the Best Match values. Because each entry in the Verification Table contains a large number of usable verification keys, in block 313, the server selects a smaller subset of key candidates that will be used in the current disc verification. The subset is selected using a pseudo-random sequence that is seeded with the client network address and the current time reduced to half-day resolution (i.e., the same key candidates will be selected for a given network address during a given half day).

In block 313, the key region (the region of audio data on the CD from which each key was computed) is enlarged using the pseudo-random sequence so that the actual key region starts at a pseudo-random offset within the enlarged key region. In addition to the real key candidates selected from the Verification Table entry, a set of decoy keys are also generated, also using the address/time-seeded pseudo-random sequence (i.e., the same decoy key candidates will be generated for a given network address during a given half day). The decoy keys are chosen so as not to overlap the audio data regions from which the real keys are derived. In an alternate embodiment, a random sequence is used to select and adjust keys and generate decoy keys so that each verification attempt by a client causes the server to specify a different set of verification regions.

The server then proceeds to construction of a Verification Response message. The Verification Response message is constructed by the server in response to an Initial Request message from the client. It is also constructed in response to a Verification Request message from the client that fails the verification test as discussed below.

Also in block 313, from the key candidates selected during Initial Request Processing, the server selects one or more keys and includes the offset and length data for each key region in the Verification Response message. A key candidate is used only once during a single disc verification. When all key candidates have been used and the disc has not been successfully verified, the verification fails.

From the decoy key candidates selected during Initial Request Processing, the server selects one or more decoy keys and includes the offset and length data for each key region in the Verification Response message. A decoy key candidate is used only once during a single disc verification. The server generates enough decoy keys during Initial Request Processing so that the decoy keys are not exhausted before the disc keys.

The state of the disc verification process is encrypted and included in the Verification Response message. This includes the presumed identity of the disc, the selected key candidates, the generated decoy key candidates, and the key usage information (which keys/decoys have been requested from the client). The state information is returned to the server by the client in the Verification Request message and is decrypted by the server and used to restore the state of the verification process. The Track Alignment Guide data stored in the Verification Database entry is included in the Verification Response message. Finally, the Verification Response message is sent to the client.

In block 315, for each of the key regions requested by the server, the client determines in which track the region resides, checks the track alignment, and reads the requested data. The client begins track alignment by reading a block from the midpoint of that track and attempting to locate audio data that matches the Track Alignment Guide Data supplied by the server. If the track alignment data is not found, the client reads and searches adjoining blocks until the alignment data is found or a predefined number of blocks have been searched.

The client then computes the offset between the expected location of the track alignment data and the apparent location. After adjusting the location of the requested audio data region by the alignment offset computed, the client reads the audio data from the disc and includes it in the Verification Request message. The client includes the TOC data in the Verification Request message since the server preserves no client state. The Encoded State Information included by the server in the Verification Response message is copied by the client unmodified into the Verification Request message. The Verification Request message is sent to the server. In an alternate embodiment, the client state information is maintained by the server for the duration of the client verification session and is not sent to or received from the client.

In block 317, the server receives the Verification Request message from the client and proceeds to extract the Key Region data. Verification Request Processing is then performed by the server upon receipt of a Verification Request message from the client. The Encoded State Information is extracted, decoded, and used to restore the state of the verification process. For each key region supplied by the client, the server tests the client-supplied data against the corresponding Key Data stored in the disc's entry in the Verification Table. Any data supplied by the client for a decoy key region is discarded.

The server then attempts to locate the actual key region within the enlarged key region data supplied by the client by locating the region that provides the greatest number of values that match the corresponding values in the Key Alignment Guide Data. The server computes a hash value, using the SHA-1 algorithm, of the key region identified in the alignment step. This hash value is compared with the value stored with the Key Data in the disc's entry in the Verification Table. If the values match exactly, the verification is successful, and the server constructs a Verified Response message. On the other hand, if the values do not match exactly, a Key Songprint is computed by the server.

In block 319, a Key Songprint is computed from the key region identified in the alignment step. An RMS difference is computed between the corresponding individual byte values of the songprint computed from the client-supplied data and the songprint that is stored with the Key Data in the disc's entry in the Verification Table. If the RMS difference is less than or equal to a predefined threshold value, the verification is successful and the process follows the Yes path from block 319 to block 321 where the server constructs a Verified Response message.

Returning to block 319, if the server determines the RMS difference exceeds the threshold, the process continues to block 323 and if one or more of the key candidates selected during Initial Request Processing have not yet been requested from the client, the process follows the Yes Path from block 323 to block 313 and the server proceeds to construct a new Verification Response message.

Returning to block 321, the Verified Response message is constructed by the server upon completion of a successful verification. The server includes identifying information for the verified disc including, for example, the disc's title and artist. Additional information is included as required by the overall application.

The server also computes the offset between the expected location of the key region within the enlarged key region and the actual location. This offset value is included in the Verified Response message to enable the client to adjust data read operations in future verifications. The server computes and encrypts authorization data, as required by the overall application, which the client can present to third-parties as credentials certifying that the disc has been verified. The Verified Response message is sent to the client.

Returning to block 323, if the RMS difference exceeds the threshold and all key candidates have been exhausted, the verification fails. The process then follows the No path to block 325 where a Not Verified Response message is constructed by the server upon failing to locate in the Identification Table an entry that acceptably matches the disc being verified.

The client may also be programmed to respond in a particular manner to any of the system's messages, including a Verified message, a Not Verified message, or a Not Found message. For example, if the CD is verified, the client may be programmed to display information about the CD, or to automatically play the CD.

The invention claimed is:

1. A system comprising:
    a plurality of network servers and a communications network for use in connecting said plurality of network servers with a plurality of user devices, said system further comprising:
    a memory store comprising a verification database, said verification database comprising information corresponding to each of a plurality of digitized content masters, for each digitized content master said verification database comprising:
        table of contents information corresponding to the digitized content master;
        at least one songprint identifier derived from the digitized content master;
    at least one processor coupled to said store, said at least one processor configured to:
        receive table of contents information from a user device of the plurality of user devices;
        receive at least one songprint identifier derived from digitized content at the user device; and
        determine whether or not to provide information authorizing play of the digitized content at the user device, said determination being made using said verification database, the received table of contents information and the received at least one songprint identifier.

2. The system of claim 1, wherein the table of contents information comprises at least one length of digital content.

3. The system of claim 1, wherein said at least one processor is further configured to request at least one of a plurality of regions of digitized content from the user device.

4. The system of claim 3, wherein the request for one or more regions of digitized content is generated as a function of a pseudo-random sequence.

5. The system of claim 4, wherein the pseudo-random sequence is a function of a network address of the user device.

6. The system of claim 4, wherein the pseudo-random sequence is a function of a time of day.

7. The system of claim 4, wherein the pseudo-random sequence is a function of both a network address of the user device and a time of day.

8. The system of claim 4, wherein said at least one processor configured to request at least one of a plurality of regions of digitized content is further configured to request at least one of a plurality of decoy regions of digitized content from the user device.

9. The system of claim 8, wherein the request for at least one of a plurality of decoy regions of digitized content is a function of a pseudo-random sequence.

10. The system of claim 9, wherein the pseudo-random sequence is a function of a network address of the user device.

11. The system of claim 9, wherein the pseudo-random sequence is comprising a function of a time of day.

12. The system of claim 9, wherein the pseudo-random sequence is comprising a function of both a network address of the user device and a time of day.

13. The system of claim 8, wherein the request for one or more than regions of digitized content is further comprised of only one non-decoy region of digitized content from the user device.

14. The system of claim 1, wherein said verification database is further comprised of only one songprint identifier derived from the digitized content master.

15. The system claim 1, wherein said at least one processor is further configured to verify whether the received table of contents information correlates with the table of contents information corresponding to any of the plurality of digitized content masters.

16. The system of claim 1, wherein said at least one processor is further configured to verify whether the received table of contents information correlates perfectly with the table of contents information corresponding to any of the plurality of digitized content masters.

17. The system of claim 1, wherein said at least one processor is further configured to verify whether the received songprint identifier correlates with the songprint identifier derived from any of the plurality of the digitized content masters.

18. The system of claim 1, wherein said at least one processor is further configured to verify whether the received songprint identifier correlates perfectly with the master songprint identifier derived from any of the plurality of digitized content masters.

19. The system of claim 1, wherein at least one of said plurality of network servers is coupled to a reader configured to read the digitized content master stored on a medium and the table of contents information corresponding to the digitized content master comprises at least one master table of contents identifier, said at least one processor is further configured to generate the table of contents identifier corresponding to a digitized content master stored on the medium, said at least one processor is further configured to:
  read table of contents data from the medium;
  compute a cryptographic hash value of the concatenation of the lengths of a plurality of tracks on the medium; and
  truncate the cryptographic hash value.

20. The system of claim 1, wherein each received songprint identifier is derived from a digitized content copy.

21. The system of claim 20, wherein the received table of contents information and at least one songprint identifier corresponds to the digitized content copy, and wherein said at least one processor is further configured to use the received table of contents information and at least one songprint identifier to identify a correlation between a digitized content master having corresponding information stored in said verification database and the digitized content copy.

22. The system of claim 21, wherein said at least one processor is further configured to verify the digitized content copy using information stored in said verification database corresponding to the correlated digitized content master.

23. The system of claim 21, wherein said at least one processor is further configured to request at least one content portion of the digitized content copy using the identified correlation between one of the digitized content masters and the digitized content copy.

24. A system comprising a plurality of network servers and a communications network for use in connecting said plurality of network servers with a plurality of user devices, said system comprising:
  a memory store comprising a verification database, said verification database comprising information corresponding to each of a plurality of digitized content masters, for each digitized content master said verification database comprising:
    table of contents information corresponding to the digitized content master;
    at least one songprint identifier derived from the digitized content master; and
  at least one processor coupled to said store, said at least one processor configured to:
  receive table of contents information from a user device of the plurality of user devices;
  receive at least one songprint identifier derived from digitized content at the user device; and
  as a function of whether or not the received selections of table of contents information correlate with any of the table of contents information of said verification database, request at least one of a plurality of regions of the digitized content from the user device.

25. The system of claim 24, wherein said at least one processor is further configured to verify whether the received table of contents information correlates perfectly with table of contents information corresponding to any of the digitized content masters.

26. A system comprising:
  a plurality of network servers and a communications network for use in connecting said plurality of network servers with a plurality of user devices, said system further comprising:
a memory store comprising a verification database, said verification database comprising information corresponding to each of a plurality of digitized content masters, for each digitized content master said verification database comprising:
  table of contents information corresponding to the digitized content master;
  at least one songprint identifier corresponding to the digitized content master;
at least one processor coupled to said store, said at least one processor configured to:
  receive table of contents information from a user device of the plurality of user devices;
  receive at least one songprint identifier derived from digitized content at the user device;
  as a function of whether or not the received songprint identifier correlates with any songprint identifier of said verification database, request at least one region of the digitized content from the user device.

27. The system of claim 26, wherein said at least one processor is further configured to verify whether the received songprint identifier correlates perfectly with any of the songprint identifiers of said verification database.

28. A system comprising:
    a plurality of network servers and a communications network for use in connecting said plurality of network servers with a plurality of user devices, a network server further comprising:
a memory store comprising a verification database, said verification database comprising information corresponding to each of a plurality of digitized content masters, for each digitized content master said verification database comprising:
    table of contents information corresponding to the digitized content master;
    at least one songprint identifier corresponding to the digitized content master; and
at least one processor coupled to said store, said at least one processor configured to:
    receive table of contents information from a user device of the plurality of user devices;
    receive at least one songprint identifier derived from digitized content at the user device; and
    as a function of whether or not the received table of contents information and at least one songprint identifier correlate with any of the table of contents information and songprint identifiers of said verification database, request at least one of a plurality of regions of the digitized content from the user device.

29. The system of claim 28, wherein said at least one processor is further configured to verify whether the received table of contents information correlate perfectly with any of the table of contents information of said verification database and the received at least one songprint identifier correlates perfectly with any of the songprint identifiers of said verification database.

30. In a system comprising a communications network, at least one of a plurality of network servers comprised of a verification database comprising information corresponding to each of a plurality of digitized content masters, for each digitized content master said verification database comprising table of contents information corresponding to digitized content master and at least one songprint identifier derived from the digitized content master, and at least one of a plurality of user devices, the method of identifying digitized content stored on a medium comprising the steps:
    the network server receiving table of contents information from a user device of the plurality of user devices;
    the network server receiving at least one songprint identifier derived from digitized content at the user device; and
    the network server determining whether or not to provide information authorizing play of the digitized content, said determining being made using said verification database, the received table of contents information and the received at least one of songprint identifier.

31. The method of claim 30, further including the step of verifying whether one of the received selections of table of contents information correlates with any of the table of content identifiers of said verification database.

32. The method of claim 30, further including the step of verifying whether the received table of contents information correlates perfectly with any of the table of contents information of said verification database.

33. The method of claim 30, further including the step of verifying whether the received at least one songprint identifier correlates with any of the songprint identifiers of said verification database.

34. The method of claim 30, further including the step of verifying whether the received at least one songprint identifier correlates perfectly with any of the songprint identifiers of said verification database.

\* \* \* \* \*